United States Patent [19]
Murakami et al.

[11] Patent Number: 5,742,586
[45] Date of Patent: Apr. 21, 1998

[54] ACCESS CONTROL DEVICE FOR RING-TYPE ATM NODE

[75] Inventors: Ken Murakami; Toshihiro Shikama, both of Tokyo, Japan

[73] Assignee: Mitsubishi Denki Kabushiki Kaisha, Tokyo, Japan

[21] Appl. No.: 570,322

[22] Filed: Dec. 11, 1995

[51] Int. Cl.$^6$ .............................. H04J 3/14; H04L 12/56
[52] U.S. Cl. ..................... 370/230; 370/417; 395/200.13
[58] Field of Search .................... 370/229, 230, 370/231, 232, 235, 417; 395/200.13

[56] References Cited

U.S. PATENT DOCUMENTS

| | | | |
|---|---|---|---|
| 5,163,046 | 11/1992 | Hahne et al. | 370/237 |
| 5,274,644 | 12/1993 | Berger et al. | 370/230 |
| 5,426,635 | 6/1995 | Mitra et al. | 370/229 |
| 5,533,009 | 7/1996 | Chen | 370/232 |
| 5,539,747 | 7/1996 | Ito et al. | 370/235 |
| 5,602,830 | 2/1997 | Fichou et al. | 370/232 |

FOREIGN PATENT DOCUMENTS 1-223852  9/1989  Japan.
4-329045  11/1992  Japan.

OTHER PUBLICATIONS

Anwar Elwalid, et al. "A New Approack for Allocating Buffers and Bandwidth to Heterogeneous, Regulated Traffic in an ATM Node" IEEE Journal on Selected Areas in Communications, Aug. 1995.

*Primary Examiner*—Douglas W. Olms
*Assistant Examiner*—Min Jung
*Attorney, Agent, or Firm*—Wolf, Greenfield & Sacks, P.C.

[57] ABSTRACT

A transmission buffer or buffers storing therein transmission cells for at least 2 $(W-n_a)$ cell time assuming that a window size in a ring is W cells and a number of transmission cells allocated to a node in said W cells is $n_a$ pieces, a transmission cell number counter for counting a number of transmission cells from the node within the W window size from a current point of time, and a transmission control means for sending out the transmission cells stored in said transmission buffer to a transfer path if a number of cells indicated by said transmission cell number counter is within a number of transmission cells allocated to the node are provided. Also at least $2n_a$ pieces of transmission buffers are provided as transmission buffers assuming that a number of transmission cells allocated to the node is $n_a$ pieces.

16 Claims, 16 Drawing Sheets

F I G. 2
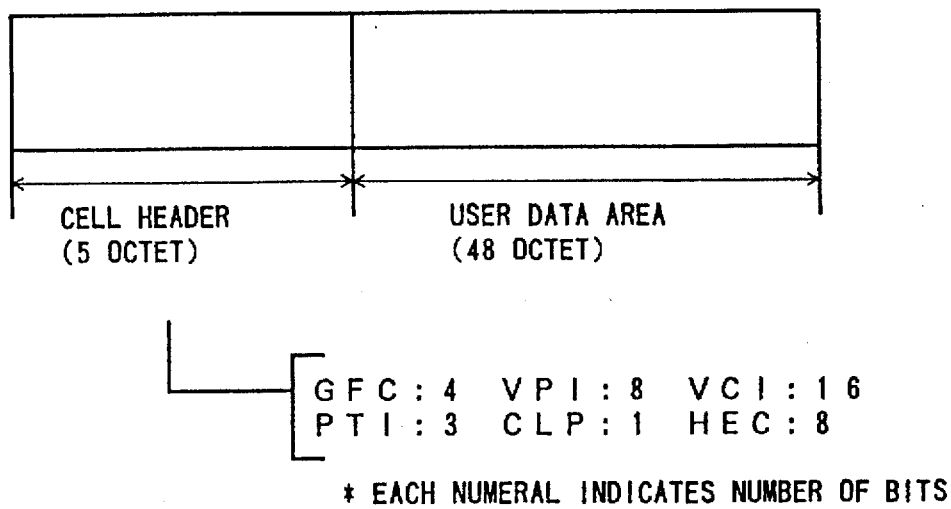

F I G. 3A
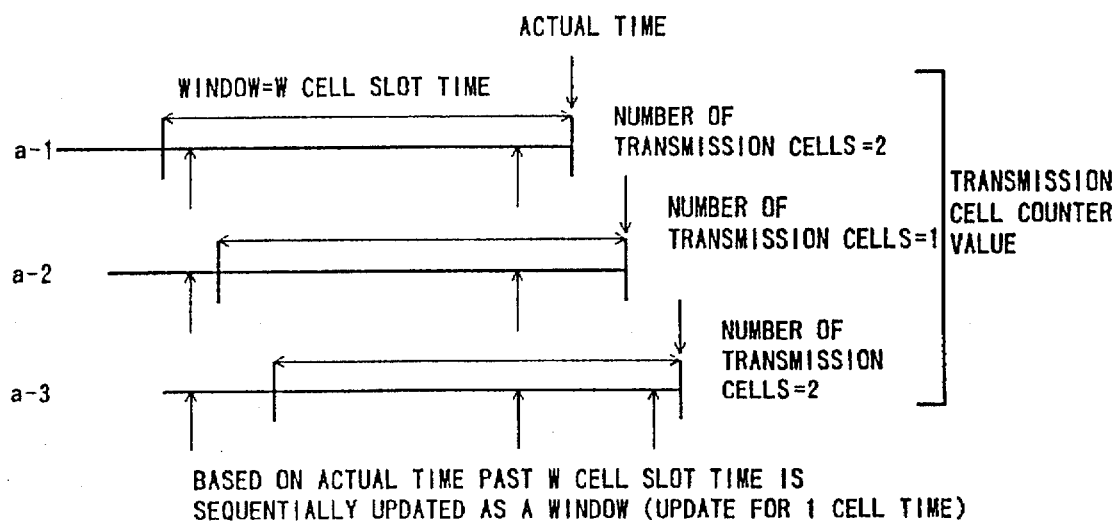
F I G. 3B
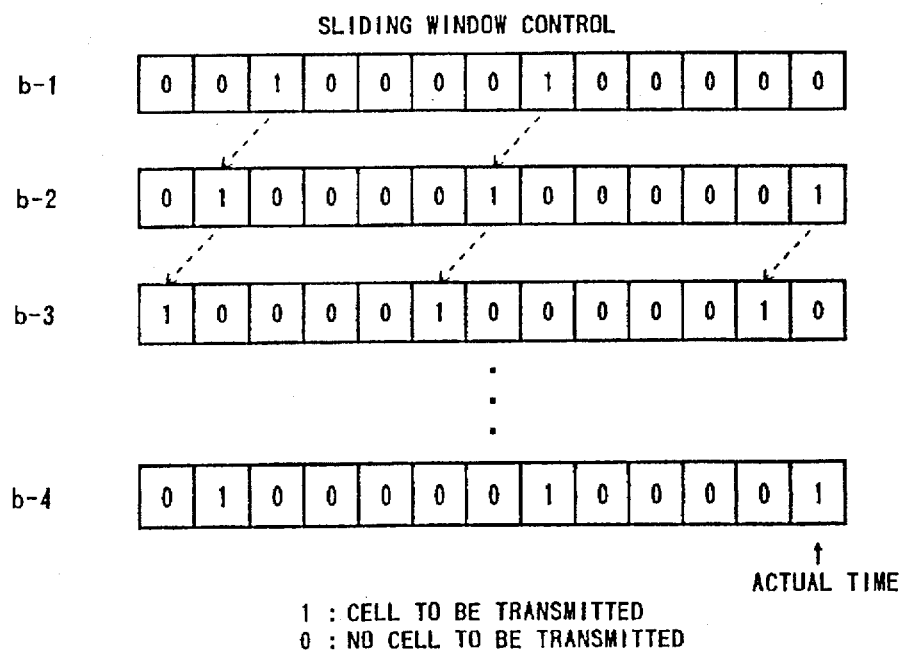
1 : CELL TO BE TRANSMITTED
0 : NO CELL TO BE TRANSMITTED

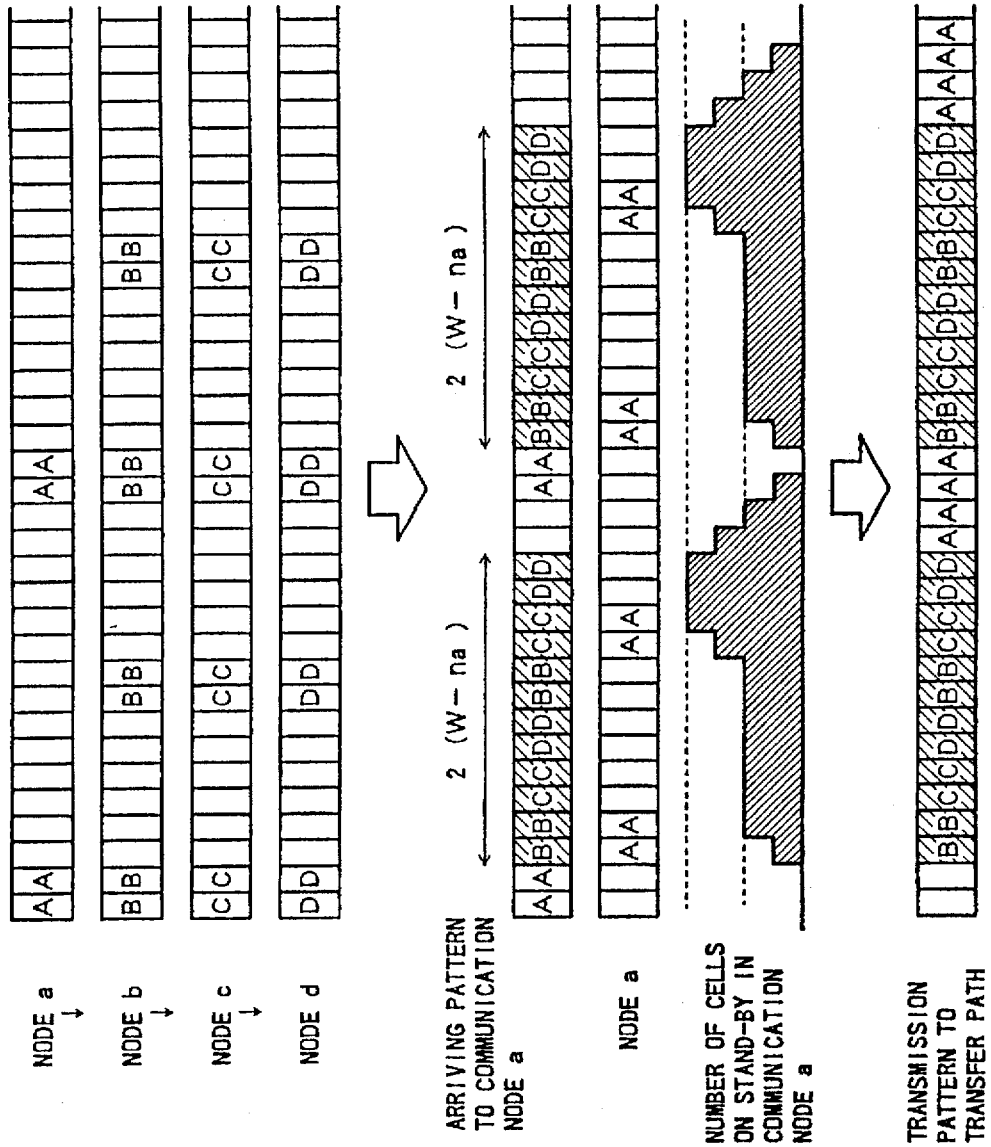

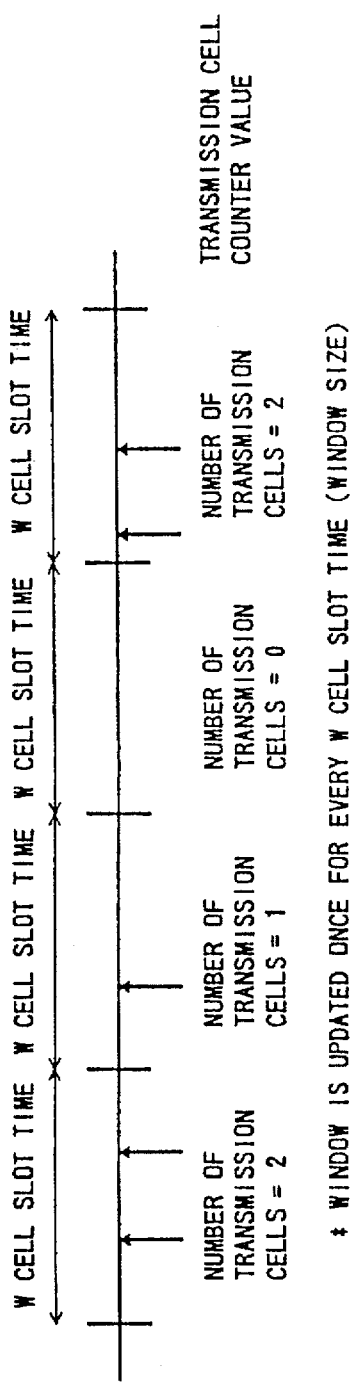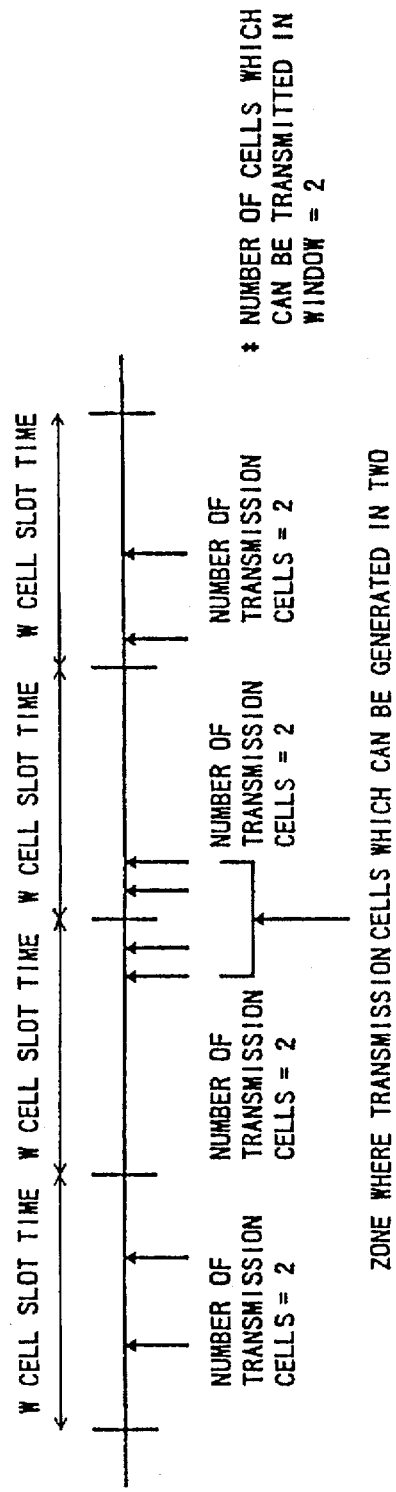

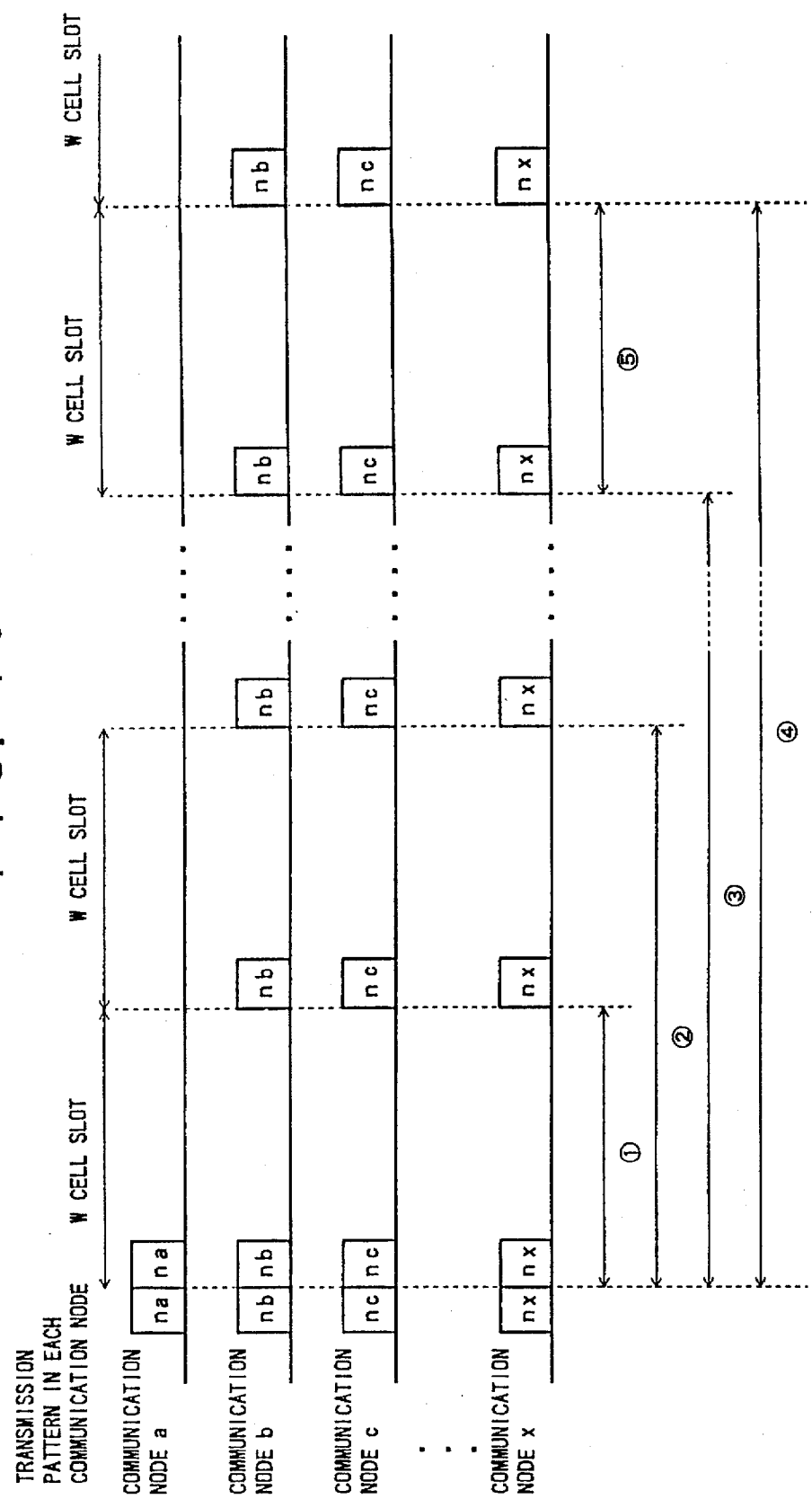

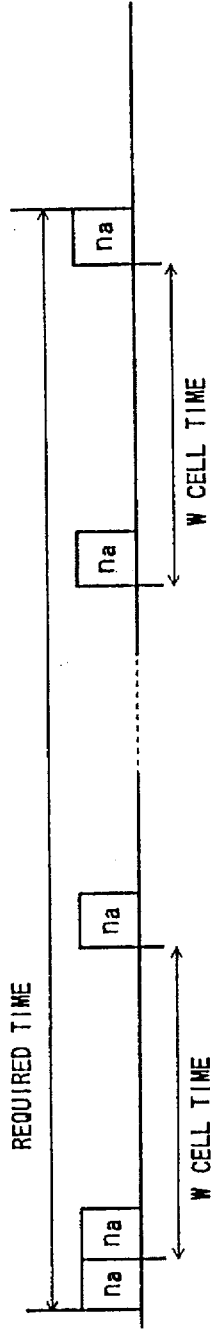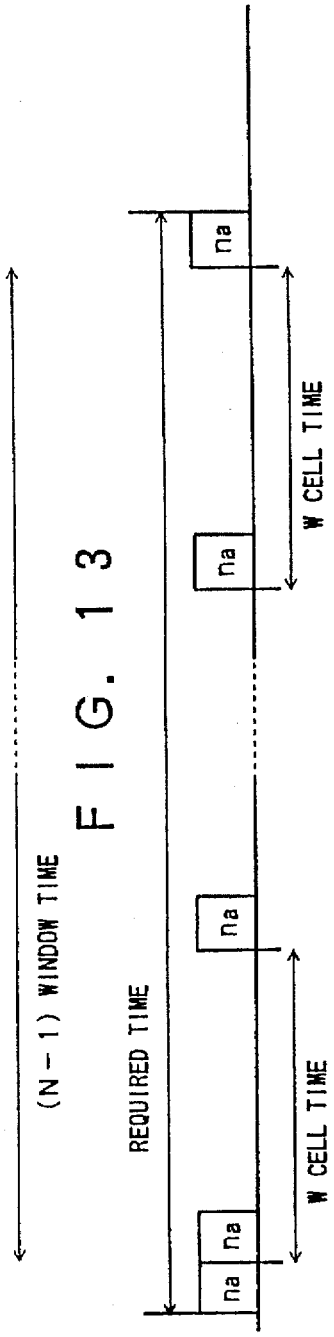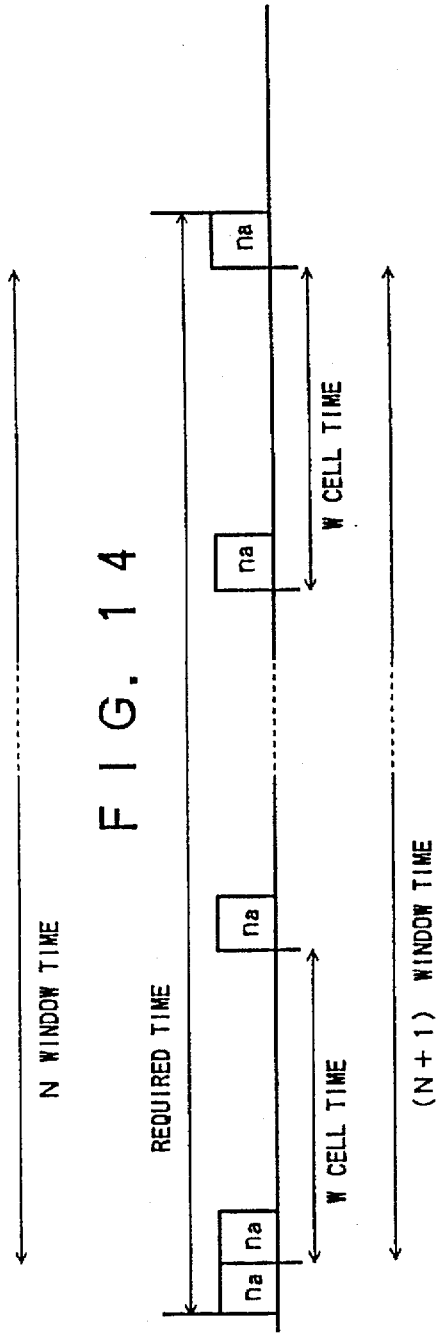

ACF : BUSY ADDRESS AREA/RESET INSTRUCTING AREA
RVCI : TRANSMISSION TARGET ADDRESS AREA 5,742,586

1

ACCESS CONTROL DEVICE FOR RING-TYPE ATM NODE

FIELD OF THE INVENTION

The present invention relates to a communication node realizing an ATM communication for multi-media communications, and more particularly to an access control device for a communication node having a buffer for suppressing a delay time in a cell changing according to situation of a communication network as well as for preventing a cell from being aborted.

BACKGROUND OF THE INVENTION

As an access control system in a communication network in which a plurality of communication nodes are connected to each other through one or a plurality of transfer paths and packet communications is executed between a plurality of terminals accommodated in these communication nodes, there has been known a slotted ring system in which packet communications is executed by using slots (cells) each having a fixed length. An ATMR (ATM Ring) realizing the high speed LAN (Local Area Network) is one of the examples.

In the ATMR protocols, as disclosed by Japanese Patent Application No.50310/1988, specific cell header data is employed. A cyclic communication zone (window size) common to all communication nodes is provided, each communication node has a window size register indicating a limit value for a number of transmission cells in the communication zone, and in a case where there is any cell or cells to be transmitted, the communication node transfers at maximum cells indicated by the window size register for each communication zone described above. As described above, in the ATMR protocol, a cyclic communication zone is provided, and furthermore a number of cells to be transmitted in the communication zone is limited for each communication node to enable audio and image communications with a short allowable delay time. Description is made for communication sequence according to the ATRM protocol with reference to FIG. 17.

The basically cyclic communication zone is called window, each communication node transmits contents of the cells to be transmitted within the set-up window size time, any of the nodes sets up a reset cell and sends it out to a transfer path when all nodes have finished transmission, each node prepares for reset by checking that the reset node has been specified, and when the reset cell goes round the ring and returns to the start node, it is recognized that each node is ready for reset and the next window cycle is started.

FIG. 17 is a view showing the system configuration, and in this figure, designated at the reference numeral 1 is each communication node, at 2 a transfer path, and at 3 a terminal connected to a communication node. FIG. 18 is a particular cell format used in this system, and the header section 30a is different from the standard specification. FIG. 19 is a block diagram showing details of each communication node, and in this figure, designated at the reference numeral 11 is a destination address identifying section for identifying a destination address of a received communication cell, at 10 a busy address identifying/setting section for checking and rewriting a busy address of the header 30a, and at 12 a cell transfer control section for controlling transmission of a cell transferred or sent out from a node. Also the reference numeral 16 indicates a received cell buffer, while the reference numeral 20 indicates a reset flag storage section for storing therein the data that all the other communication nodes are now in the transmission-stopped state and this reset flag storage section is reset in the beginning of a window cycle. Also in the figure, designated at the reference 13a is a window control section, at 14 a transmission control section for controlling transmission of a transmission cell to a transfer path, at 15 a transmission buffer, at 17 a transmission cell number counter, at 18 a window size register for setting therein a number of transmission cells allocated to each node in a window size, and at 19 a comparator.

Further, detailed description is made for this operation.

All of the communication nodes 1 each connected to a ring-type transfer path has a window size register 18 indicating a limit value for a number of transmission cells in a communication zone, and a transmission cell number counter 17 for counting a number of transmission cells in the communication zone. When a communication cell is transmitted from a terminal 3 connected to the communication node 1, the communication node 1 stores the communication cell in a transmission buffer 15 therein, and sends out the communication cell to the transfer path 2 with the FIFO mechanism. The communication cell sent to the transfer path 2 is received by a communication node to which a terminal, a destination of the communication cell, is connected, and then transferred to the terminal. This communication cell comprises, as shown in FIG. 18, the cell header 30a having an address area for setting therein an address of a communication node to which the communication cell is transmitted and a busy address area in which a communication node executing ATM communications sets a busy address for the communication node, and a user data area for setting therein user data. According to a value of the busy address set in the busy address area in the cell header described above, controls as described below are provided for the ATM communications between communication nodes. It should be noted that the communication cell is transmitted according to a timing (cell slot) specified between the communication nodes.

When a communication node is in the transmission-stopped state, if a communication cell with reset data set in a busy address area of the communication cell is received, a reset flag 20 and a transmission cell number counter 17 are reset, and the next window cycle is effected to start window control.

In a case where a value indicated by a transmission cell number counter in a communication node is less than a limit value for a number of transmission cell set in a window size register and any cell exists in a transmission buffer for the communication node, if a busy address of other communication node is described in a busy address area for a communication node received by the busy address identifying/setting section 10, a busy address of the communication node is set in a busy address area of a communication cell to be transmitted to a downstream adjoining communication node, and the communication cell is transmitted to the downstream adjoining communication node.

Also when transmission of cells allocated to a node in a window size has been finished, accordingly in a case where a value indicated by a transmission cell number counter in the transmission node is more than a limit value for transmission cells set in the window size register or in a case where any cell does not exist in a transmission buffer in the communication node, if a busy address of other communication node is described in a busy address area of a received communication cell, a value set in the busy address area of the received cell is set in the busy, address area of a communication cell to be transmitted to a downstream adjoining communication node, and the cell is transmitted to the downstream adjoining communication node.

In transaction of the communication cell described above, if the address described in an address area of the communication cell received by the communication node does not coincide with an address of the communication node, the address area and user data area of the communication cell are not changed, and the received communication cell is transmitted to the downstream adjoining communication node. In a case where the address described in an address area of a communication cell received by a communication node coincides with an address of the communication node, namely in a case where the received cell is a communication cell transmitted to the communication node, or in a situation where a received communication cell is a cell not actually used for communication and at the same time a value indicated by a transmission cell number counter in the communication node is less than a value in the window size register and also a cell exists in a transmission buffer in the communication node, a communication cell present at a head of the transmission buffer in the communication node is transmitted to a downstream adjoining communication node in place of the received cell.

In a case where an address described in an address area of a communication cell received by a communication node coincides with an address of the communication node, or in a situation where the received communication cell is a cell not actually used for communication and at the same time a value indicated by a transmission cell number counter in the transmission node is more than a value in the window size register or any cell does not exists in a transmission buffer of the communication node, the cell not used for actual communication is transmitted to a downstream adjoining communication node in place of the received cell.

Furthermore, in a situation where a value indicated by a transmission cell number counter in the communication node is not less than a limit value for transmission cells set in the window size register or any cell does not exist in a transmission buffer in the communication node, if a busy address equivalent to that of the communication node is set in a busy address area of the received communication cell, reset data for initializing transmission cell number counters owned by all communication nodes in the communication system is set as a trigger for reset in a busy address area of a transmission cell to be transmitted to a downstream adjoining communication node, the communication cell is transmitted to a downstream adjoining communication node, and data concerning the fact that a communication cell with the reset data set therein has been transmitted is stored in the communication node. In the communication node which transmitted the reset data, if a busy address of other communication node is described in a busy address area of a received communication cell, a busy address of the communication node (having transmitted the reset data) is set in a busy address area of a communication cell to be transmitted to a downstream adjoining communication node, the communication is transmitted to the downstream adjoining communication node, and if the reset data is described in a busy address area of a received communication cell, the communication node deletes the memory that the node has transmitted reset data, sets a busy address of the communication node in a busy address area of a communication cell to be transmitted to a downstream adjoining communication node, and transmits the communication cell to the downstream adjoining communication cell.

Then, when a communication cell with the reset data set therein goes round once, the next window cycle is effected and transmission is started.

In the communication system as described above, a period of time from a point of time when a communication cell from a terminal is stored in a transmission buffer in a communication node until a point of time when the communication cell reaches via a transfer path to a target terminal is divided to a fixed delay time such as a period of time for a communication cell to be transferred through a transfer path, or a period of time required for processing in a communication node, and a delay time changing according to situations in a communication network such as a period of time required for transmission access to a transfer path and a period of time required for standing-by in a communication node. Closely related to the delay time changing according to situations in a communication network are a window size for each communication node connected to the communication network and a communication zone commonly set to all communication nodes.

A method of insuring a delay time until a communication cell transmitted from a communication node passes through a transfer path and again arrives at the communication node having transmitted the communication cell in a communication network in which a plurality of communication nodes are connected to each other with a ring-type transfer path is described in Japanese Patent Laid-Open No.329045/1992. In the method of insuring a delay time described above, all communication nodes in a communication network recognize a communication zone according to a communication cell used in the ATMR protocols and a window size in each communication zone is decided so that the maximum delay time will be suppressed to a period of time equivalent to two times of the communication zone.

In the example of conventional technology described above, at first all nodes decide a common window period and provide controls so that transmission cells allocated to each transmission node will be transmitted within the decided window period, so that it is required to provide a reset flag set-up circuit for checking common reset in the window in each node.

Furthermore, a busy address having a unique cell format which is different from the standard cell format specified in the ITU-T recommendations I.361 is specified, and all communication nodes know a common window during communication by checking contents of a cell header in each communication node, so that a specific busy address setting/identifying circuit is required, Also there is no idea that communication cells are classified to a plurality of classes in terms of a delay time to take necessary measures against at least delay of communication cells classified to a high priority class, so that sometimes a cell having a high priority may be delayed or aborted.

SUMMARY OF THE INVENTION

It is an object of the present invention to provide an access control device for a ring-type ATM node in which communication cells allocated to each communication node are transmitted within a window period which is a communication zone with the standard cell format without requiring a reset recognizing circuit in each node nor a particular busy address setting/identifying circuit.

An access control device for a ring-type ATM node according to the present invention determines whether a number of transmission cells waiting for transmission in a communication node within a window size decided in the system is within a number of transmission cells allocated to the communication node or not, and transmits the cells to the transfer path if it is determined that there is any empty cell or any cell target to the communication node and at the same time there are transmission cells within a number of transmission cells allocated to the communication node. If a number of cells waiting for transmission is equal to or more than a number of cells allocated to the communication node, transmission from the communication node is suppressed until start of the next window size period. The transmission cells are maintained in a transmission buffer at least for 2 $(W-n_a)$ cell time.

Also, up to $2n_a$ pieces of transmission cell are maintained in a transmission buffer in a communication node, and are transmitted to a transfer path during the next window size period without fail.

The access control device for a ring-type ATM node according to the present invention determines whether a number of transmission cells waiting for transmission in a communication node within a window size periodically innovated according to a period specified in the system is within a number of transmission cells allocated to the communication node or not, and transmits the transmission cells to a transfer path if it is determined that there is any empty cell or a cell target to the communication node and at the same time there are transmission cells within a number of cells allocated to the communication node. If transmission cells waiting for transmission are equal to or more than a number of cells allocated to the communication node, transmission of the transmission cells from the communication node is suppressed until start of the next window size period. Then the transmission cells are maintained in a transmission buffer for at least (N+3) W-(N+3) $n_a$ cell time.

Also up to (N+2) $n_a$ pieces of transmission cells are maintained in a transmission buffer in the communication node, and the transmission cells are transmitted to a transfer path within the next window period.

Also transmission cells belonging to the top two higher priority groups are transmitted from the transmission buffer in a communication node to a transfer path.

Furthermore transmission cells having a high priority and maintained in a transmission buffer in a communication node are transmitted to a transfer path before the cells are aborted.

Other objects and features of this invention will become understood from the following description with reference to the accompanying drawings.

BRIEF DESCRIPTION OF THE DRAWINGS

FIG. 2 is a view showing a format of a cell in a user network interface (UNI) specified in ITU-T Recommendation I.361;

FIGS. 3A and 3B are explanatory views for sliding window control;

FIG. 7 is a view showing a state of waiting for a transmission cell in a node and cells on a transfer path, said state shown with concrete numerical values;

FIG. 8 is an explanatory view for jumping window control;

FIG. 9 is a view showing the worst case of transmission cell generation in jumping window control;

FIG. 10 is an explanatory view showing the worst case of a cell arriving pattern to a communication node in the jumping window control system;

FIG. 12 is a view for explanation of time required for generation of a cell in the jumping window control;

FIG. 13 is a view for explanation of time required for generation of a cell in the jumping window control;

FIG. 14 is a view for explanation of time required for generation of a cell in the jumping window control;

DESCRIPTION OF THE PREFERRED EMBODIMENTS

Description of Embodiment 1 of the present invention below assumes a case where a window size is decided for each mode, which is a basic concept for the present invention, not in coordination with other nodes, and the window is controlled according to so-called the sliding window control system.

Assuming a case where a cell is transferred between a plurality of communication nodes mutually connected to each other through a transfer path in a relay-preferred transfer system in which a cell received from the transfer path is transmitted preferentially, now description is made below for a maximum value of a delay time changing according to situations in a communication network during a period of time from a point of time when a cell is stored in a transmission buffer in a communication node until the cell arrives at a communication node having transmitted the cell and a number of buffers in a communication node required so that a cell transmitted from a communication node is not aborted in the communication node. In the following description, window control is executed according to the sliding window control in which a window is sequentially updated once for 1 cell hour.

Figure 1:
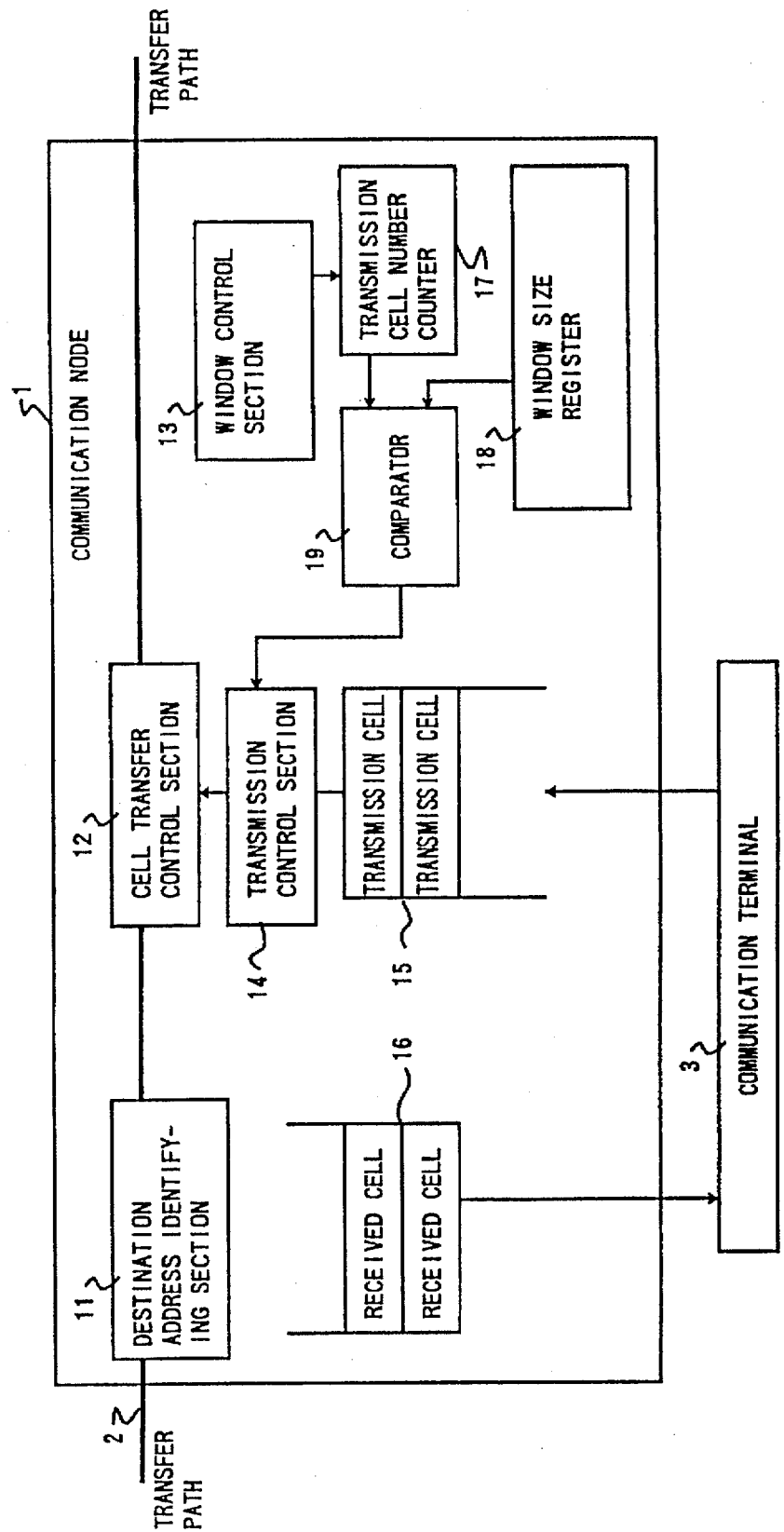
FIG. 1 is a detailed block diagram showing an access control device for a communication node according to the present invention.
Figure 19:
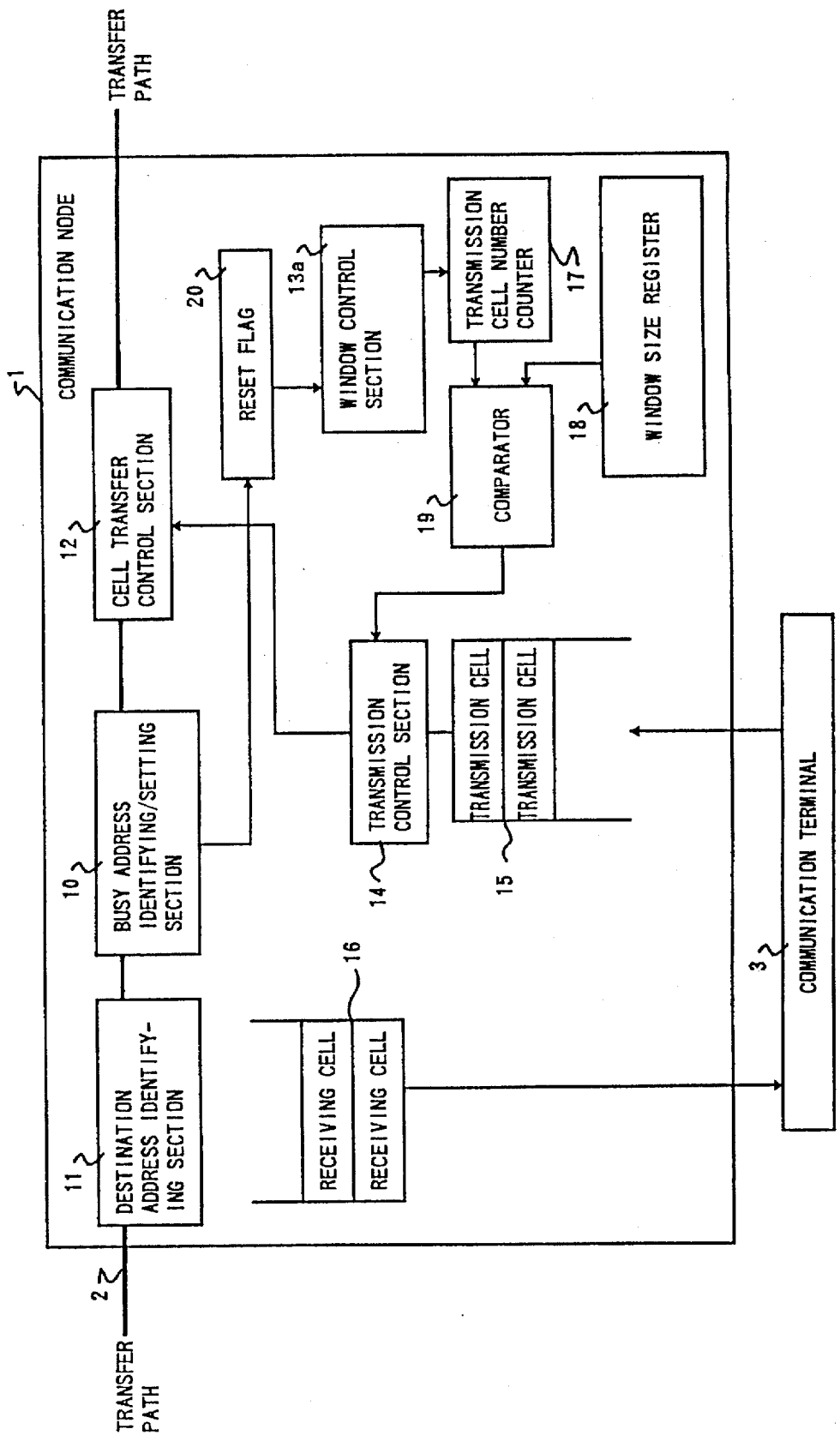
FIG. 19 is a detailed block diagram showing an access control device for a conventional type of communication node.

FIG. 1 is a detailed block diagram showing an access control device for a communication node according to the present embodiment, and in this figure the reference numeral 13 indicates a window control section for controlling a window period for each node. Other components are the same as those in the conventional technology shown in FIG. 19. As clearly shown in the figure, in this embodiment, a busy address identifying/setting section and a reset flag storage section are not necessary. In other words, the cell header may be based on the standard configuration as shown in FIG. 2. FIG. 3 is an explanatory view for operations in sliding window control. FIG. 3A shows a relation among an actual time, a window period, and the number of transmission cell, while FIG. 3B is an example of historical data on cell transmission stored in a window control section 13.

Operations of a node having the configuration as described above is as follows. When the system is initialized, each node 1 sets a window size decided in the system in a window size register 18 and a number of transmission cell allocated to the node in a transmission cell number counter 17. And a window control section 13 checks by itself the transmission cell number counter 17 for each cell slot, compares the checked number to a number of transmission cells allocated to the node in a comparator 19, and if the number is not more than a preset value, a transmission control section 14 transmits transmission cells for the node from the transmission buffer 15 to a transfer path 2.

One of the examples of delay changing according to situation of a communication network in the relay-preferred transfer system is an access delay from a point of time when a cell transmitted from the communication node 1 is stored in the transmission buffer 15 in the communication node until the cell is actually transmitted.

A transmission cell generated in the communication node 1 can actually be transmitted from the transmission buffer 15 in the communication node to the transfer path 2 only when a cell slot not used yet or a cell sent to the communication node is received. A transmission cell may directly be inserted into a cell slot not used, and a cell sent to the communication node is fetched into the communication node 1 and simultaneously a transmission cell is inserted. For this reason, in the relay-preferred transfer system, to obtain a maximum value of a delay time changing according to situation of a communication network from a point of time when a cell is stored in the transmission buffer 15 in the communication node 1 until the cell arrives at the communication node having transmitted the cell, it has only to obtain a maximum access delay time in the communication node. In the relay-preferred transfer system, an access delay becomes largest when a pattern of a cell arriving from a transfer path in a communication node to the communication node is a pattern in which cell slots other than those not used yet or other than those sent to the communication node succeed by the maximum number.

Figure 4:
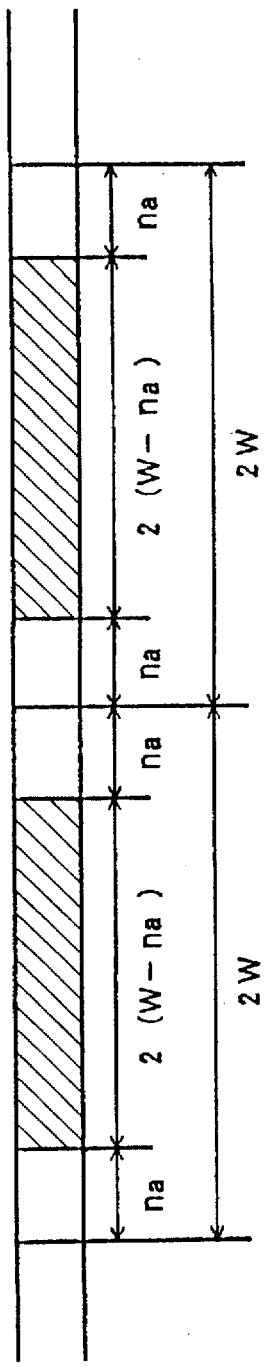
FIG. 4 is a view showing the worst case of a cell arriving pattern to a communication node in the sliding window control system according to the present invention.
Figure 5:
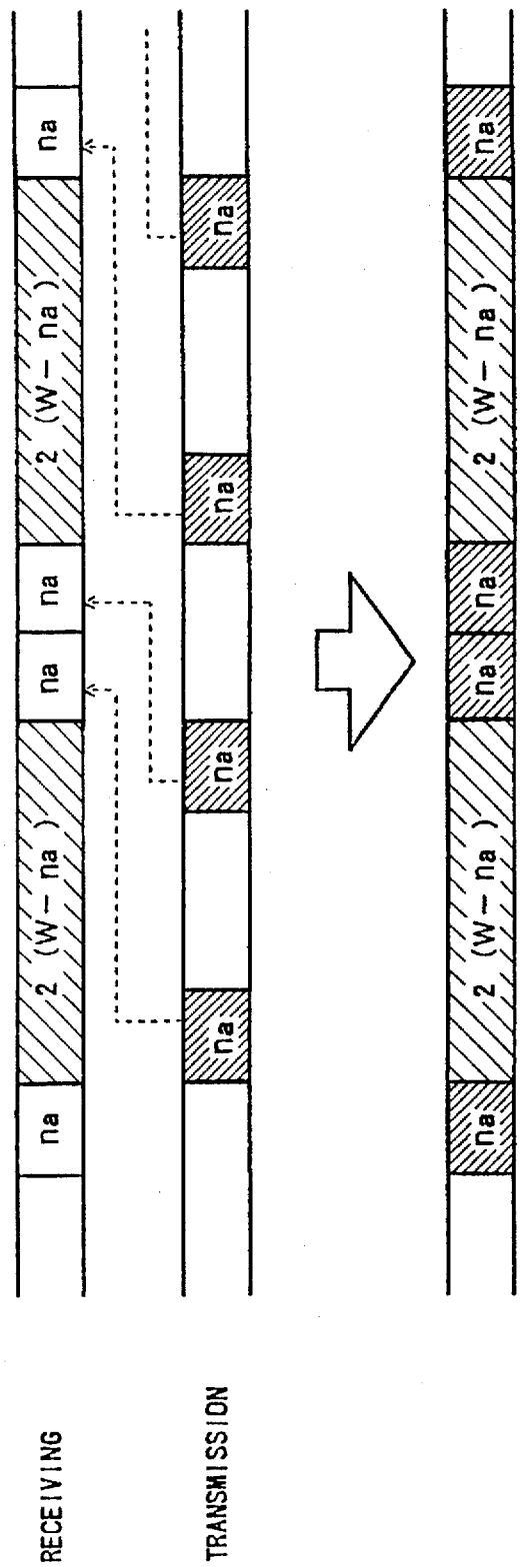
FIG. 5 is an explanatory view showing a case where a transmission cell is inserted in a communication node when a cell is received from a transfer path in the worst case shown in FIG. 4.

Next, a description is made for maximum access delay with reference to FIG. 4 and FIG. 5.

Herein assumed for description below is a window (Herein the window size is equal to W cell time) having a start position at a cell slot with a transmission cell inserted therein in a communication node a. In this window, the maximum number of cells which can be generated from communication nodes other than the communication node a is $(\Sigma n_i - n_a)$. Herein $\Sigma n_i$ is a total of cells which can actually be transmitted from all communication nodes connected to each other via a transfer path within a window W to a transfer path. Also $n_a$ indicates a number of cells which the communication node a can transmit into a window W.

The total $\Sigma n_i$ of cells which all communication nodes can transmit into a window W is at maximum W. For this reason as a cell pattern arriving from a transfer path in the communication node a, at maximum $(W-n_a)$ pieces of cell slots other than those not used yet or often than those set to the communication node successively appear within a window W. These cells may extend over a plurality of windows, and if a case is assumed where cell slots with a transmission cell inserted in the communication node a extends in a zone 2W consisting of two windows, there may be a case where at maximum 2 $(W-n_a)$ cell slots other than those not used yet or those sent to the communication node a appear successively. In a case where the arriving pattern as described above is generated, in this zone 2W, always $n_a$ pieces of cell slots not used yet or those sent to the communication node a exist before and after the 2 $(W-n_a)$ pieces of cell slots successively appearing other than those not used yet or those sent to the communication node.

A number of cells which can be transmitted from the communication node a into this zone 2W is $2n_a$ cells. The maximum access delay in this case is a period of time from a point of time when a transmission cell from the communication node a is generated at a head of a succession of 2 $(W-n_a)$ cell slots which can not be used and goes into a transmission buffer until a point of time when the transmission cell is transmitted to a transfer path.

In FIG. 5, among the $2n_a$ pieces of generated transmission cells, first $n_a$ pieces of transmission cells are transmitted with $n_a$ pieces of cell slots not used yet or those sent to the communication node a after a succession of 2 $(W-n_a)$ pieces of cell slots other than those not used yet or those sent to the communication node a, and remaining $n_a$ pieces of transmission cells are transmitted with $n_a$ pieces of cell slots not used yet or those sent to the communication node a existing at the head of the next zone 2W. So it is understood that the maximum access delay time of a transmission cell transmitted from the communication node a is 2 $(W-n_a)$ cell time.

In all the communication nodes connected to each other via a transfer path, when cell transfer is executed according to the relay-preferred transfer system in which fixed length cells arriving from the transfer path are preferentially transmitted while sliding window control is executed to cells transmitted from the communication node, the maximum access delay time from a point of time when a cell transmitted from a communication node i is stored in a transmission buffer in the communication node i until the cell arrives at the communication node i having transmitted the cell is:

$$2\ (W-n_i) < 2W$$

and thus it is insured that the maximum access delay time is within two times of the window size W cell time.

Next consideration is made for a minimum number of buffers required in a communication node so that a cell transmitted from the communication node will not be aborted in the communication node.

Figure 6:
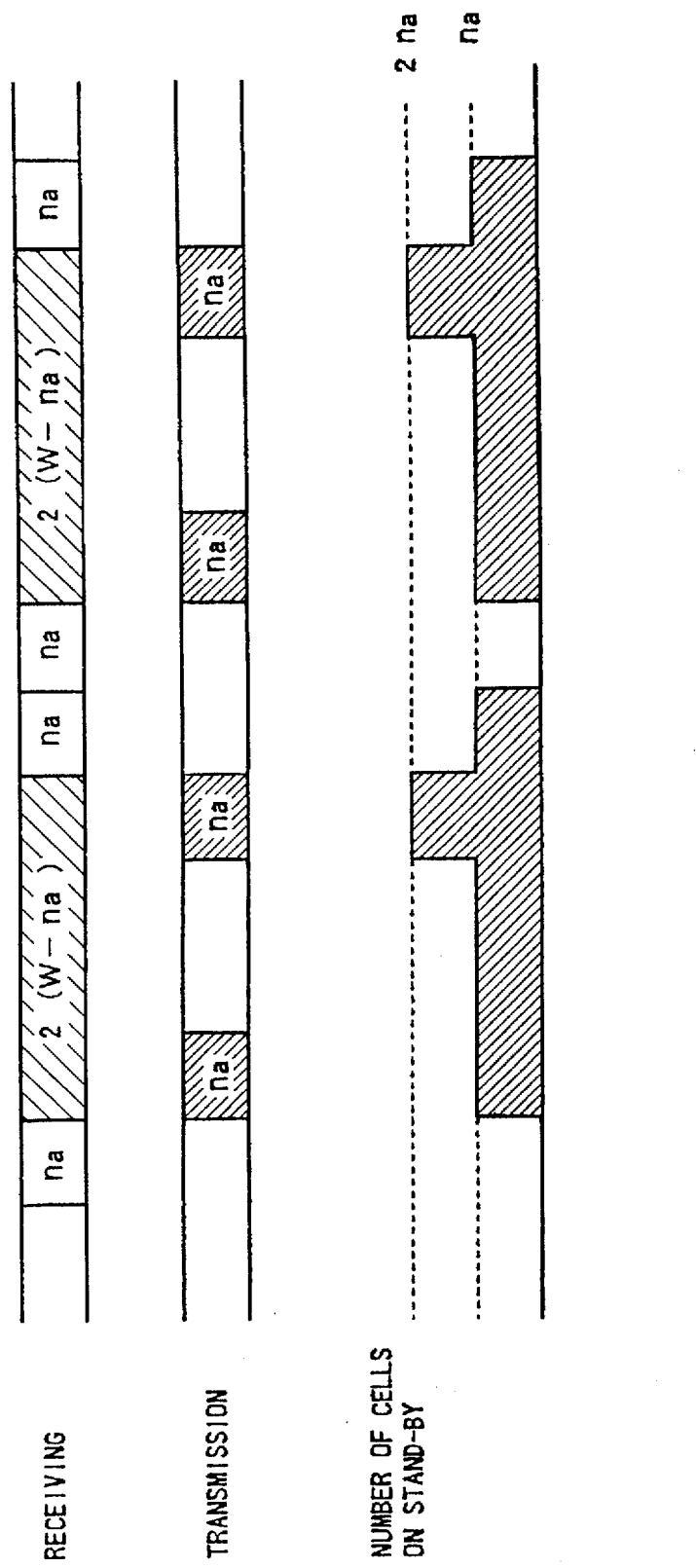
FIG. 6 is an explanatory view showing a state of waiting for a transmission cell in a communication node in a case where a cell is received from a transfer path in the worst case shown in FIG. 4.

FIG. 6 is an explanatory view for residence of transmission cells in a transmission buffer. As described in relation to FIG. 4, a maximum number of transmission cells are stored in a transmission buffer in the communication node in a case where a maximum number of cell slots other than those not used yet or other than those sent to the communication node appears successively. At maximum 2 $(W-n_i)$ pieces of cell slots other than those not used yet or other than those sent to the communication node appear successively in the communication mode i. During this period of time, transmission cells transmitted from the communication node i are stored in the transmission buffer, and a maximum number of transmission cells generated from the communication node i within 2 $(W-n_i)$ cell slots is $2n_i$ cells. For this reason, a minimum number of buffers required so that cells transmitted from the communication node i will not be aborted in the communication node i is $2n_i$ pieces.

Shown for reference in FIG. 7 are the worst case of an arriving pattern from a transfer path in a case where a number of communication nodes is 4, a number of cells which can be transmitted within the W cell time from each communication node is 2, and a window size is 8 cell time, and a number of buffers required in that case. Namely, a number of buffers required in this case is 4 pieces of $2n_a$.

In description of Embodiment 1 above, no consideration is made for usage of each individual cell for a different purpose, and the description assumes that the same cells are used for all types of communications. In this case, communications having strict requirements for a delay time and those not having strict requirements for a delay time are treated under the same conditions. For this reason, by employing a scheme in which cells preferentially treated in relation to a delay time are applied to communications having strict requirements for a delay time and cells not treated preferentially in relation to a delay time to communications not having strict requirements for a delay time, and also by preparing different buffers in each of all communication nodes in a communication network and storing the cells preferentially treated in relation to a delay time in buffers storing the preferential cells, always the preferential cells are taken out from the head of the buffer and transmitted. By employing this type of scheme, it is possible to prevent unnecessary delay caused by effects of communications not having strict requirements for a delay time over communications having strict requirements for a delay time.

Furthermore, a plurality of priority levels may be introduced to realize buffers each comprising a plurality of priority zones.

It is clear that the maximum access delay time for the preferential cells described above and a minimum number of buffers for the preferential cells for each communication node are the same as those in Embodiment 1 if the processing as described above is executed in each communication node within a communication network.

Description of this embodiment below assumes a case where window control is executed according to so-called the jumping window control system.

Now, a description is made for a maximum delay time from a point of time when a transmission cell is stored in a buffer until a point of time when the cell arrives in a communication node having transmitted the transmission cell according to the relay-preferred transfer system in a ring-type ATM system comprising a plurality of communication nodes as well as for a number of buffers required so that transmission cells to be transmitted from a communication node are not aborted in the communication node.

FIG. 8 is an explanatory view for the jumping window control in which a window is updated once for every W cell time. Herein W indicates a value for a window size normalized with cell time.

It should be noted that detailed configuration of the communication node 1 is the same as that shown in FIG. 1, and the window control section 13 monitors the next W cell slot time each time the W cell slot time shown in FIG. 8 has passed, and provides necessary controls.

Next, a description is made for delay in access with reference to the operations described above.

Transmission from a transmission buffer 15 in the communication node 1 to the transfer path 2 can actually be executed when a cell slot not used yet or cell sent to the communication node is received. The cell not used yet is used for transmission, or is fetched into the cell sent to the communication node, and then a transmission cell is inserted. For this reason, to obtain a maximum value for a delay time from a point of time when a transmission cell in the communication node 1 is stored in the transmission buffer 15 until a point of time when the transmission cell arrives at the communication node having transmitted the transmission node, it has only to obtain the maximum access delay time in the communication node like in Embodiment 1. The access delay time becomes maximum in a case where a maximum number of cell slots other than those not used yet or other than those sent to the communication node succeed as a cell pattern arriving in the communication node 1 from the transfer path 2.

In the jumping window control, a transmission cell may be generated in any cell slot in the window. For this reason, as shown in FIG. 9, cells which can be transmitted in two successive windows may be generated successively. Assuming that cells are arriving from a transfer path to a communication node a, if the cell as shown in FIG. 9 is generated in the same cell slot in all communication nodes, cell slots other than those not used yet or other than those sent to the communication node a are generated successively. For simplifying description, if it is assumed that a number $n_i$ which can be transmitted in a window are identical in all the communication nodes, the window size W can be obtained through the following equation:

$$W \geq \Sigma n_i = N n_i$$

wherein N indicates a total number of communication nodes in a communication network, and W indicates a value obtained by converting a window size to a number of cell slots.

Next, a description is made for the worst conditions for a cell arriving pattern from a transfer path to a given communication node a conceivable from the above equation with reference to FIG. 10. It should be noted herein that the window size w is defined as a total number of cells which can be transmitted from all the communication nodes into the window. Namely:

$$W = n_a + n_b + n_c + \ldots + n_x$$

It should be noted that $n_a = n_b = \ldots = n_x = n_i$. For this reason, the following equation is provided:

$$W = N n_i \qquad (1)$$

Now conditions are assumed under which a window zone ① of a cell pattern arriving from a transfer path to the communication node a can be used by a transmission cell. A number of transmission cells which can be included in the window zone ① is as expressed by the following equation:

$$n_a + 2(n_b + n_c + \ldots + n_x) = W + (n_b + n_c + \ldots + n_x) > W$$

and it is clear that all of the cell slots in this window zone ① can be used by a transmission cell. Then conditions are assumed under which a zone ② consisting of the window zone ① and a subsequent window zone is used by a transmission cell. A number of transmission cells included in the zone ② is expressed by the following equation:

$$n_a + 3(n_b + n_c + \ldots + n_x) = W + 2(n_b + n_c + \ldots + n_x)$$
$$= 3W - 2n_a$$

and the conditions under which all the cell slots in this zone ② is used by a transmission cell is:

$$3W - 2n_a \geq 2W$$

and for this reason the following expression is obtained:

$$W \geq 2 n_a$$

As can be understood from the expression (1), the equation above indicates the condition satisfied in a case where a number N of communication nodes is 2 or more, but it is assumed as the preposition that there are a plurality of communication nodes within the communication network, so that all the cell slots in this zone ② are used by a communication cell.

Similarly conditions are assumed under which an N pieces of successive window zones ③ with the window zone ① at the head are used by transmission cells. A number of transmission cells included in the zone ③ is expressed by the following equation:

$$n_a + (N+1)(n_b + n_c + \ldots n_x) = W + N(n_b + n_c + \ldots + n_x)$$

From the equation (1), the above expression can deformed to the following one:

$$(N+1)W - N n_a$$

and the conditions under which all the cell slots in this zone ③ can be used by transmission cell are:

$$(N+1)W - N n_a \geq NW$$

and for this reason, the following expression is obtained:

$$W \geq N n_a$$

From Expression (1), it is understood that the equal sign in the above expression is effective, which indicates that all the cell slots in this zone ③ can be used by communication cells. In this case, length of a zone in which cell slots other than those not used yet or other than those sent to the communication node a appear successively is (N+2) W−(N+2) $n_a$ cell slots including cells transmitted from a communication node other than the communication node a in the window ⑤ next to the zone ④.

It should be noted that the conditions under which the window zone ④ comprising (N+1) pieces of successive window zones including the window zone ① at the head thereof is used by transmission cells is:

$$W \geq (N+1) n_a$$

and it is clear from Expression (1) that the above condition can not be satisfied.

Figure 11:
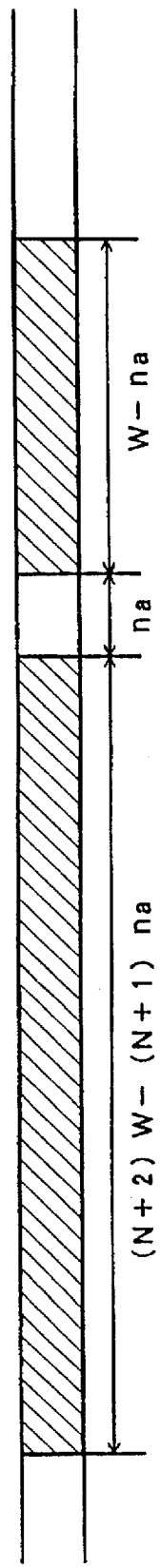
FIG. 11 is a view showing the worst case of a cell arriving pattern to a communication node in FIG. 10.

From the description above, and as shown in FIG. 11, cell slots other than those not used yet or other than those sent to the communication node a can successively appear by at maximum (N+2) W−(N+2) $n_a$ pieces.

Now, consideration is made for an access delay time in the transmission cell in a case where cells from a transfer path are received by the communication node a with the above-described pattern. The worst case is a case where cell slots other than those not used yet or other than those sent to the communication node a are the first cell slots in a succession of (N+2) W−(N+2) $n_a$ cell slots successively received, transmission cells from the communication node are generated with the transmission pattern as shown in FIG. 9, and a maximum number of transmission cells are generated in the subsequent window.

In a zone of (N+2) W−(N+2) $n_a$ cell slots where cell slots other than those not used yet or other than those sent to the communication node a are successively received, transmission cells transmitted from the communication node a are stored in a transmission buffer. Now consideration is made for a maximum number of transmission cells generated from the communication node a in a zone consisting of (N+2) W−(N+2) $n_a$ cell slots. A minimum period of time required for generation of (N+1) $n_a$ pieces of transmission cells from the communication node a is (N−1) W+2$n_a$ cell time as shown in FIG. 13. So the following expression:

$$(N+2)W-(N+2)n_a-\{(N-1)W+2n_a\}=3W-(N+4)n_a$$

is provided, and so that (N+1) $n_a$ or more pieces of transmission cells transmitted from the communication node a are generated in the (N+2) W−(N+2) $n_a$ cell slot zone in which cell slots other than those not used yet or other than those sent to the communication node a are successively received, only the following conditions is required:

$$N \geq 2$$

which indicates that a number of communication nodes is equal to or more than 2. It is assumed as a preposition that there are a plurality of communication nodes in the communication network, so it is understood that the condition is satisfied and (N+1) $n_a$ or more pieces of transmission cells transmitted from the communication node a are generated in a zone consisting of (N+2) W−(N+2) $n_a$ cell slots successively received other than those not used yet or other than those sent to the communication node a.

A minimum period of time required for (N+2) $n_a$ pieces of transmission cells from the communication node a to be generated is, as shown in FIG. 12, NW+2$n_a$ cell time. Namely the following expression:

$$(N+2)W-(N+2)n_a-(NW+2n_a)=2W-(N+4)n_a$$

is provided, and (N+2) $n_a$ or more pieces of transmission cells transmitted from the communication node a are generated in the zone consisting of (N+2) W−(N+2) $n_a$ cell slots successively received other than those not used yet or other than those sent to the communication node a in a case where the following condition:

$$N \geq 4$$

is satisfied, in other words in a case where a number of communication nodes is 4 or more.

Similarly a minimum period of time required for (N+3) $n_a$ pieces of transmission cells from the communication node a to be generated is, as shown in FIG. 14, (N+1) W+2$n_a$ cell time. Namely the following expression:

$$(N+2)W-(N+2)n_a-\{(N+1)W+2n_a\}=W-(N+4)n_a=-4n_a$$

is provided, which indicates that (N+3) $n_a$ or more pieces of transmission cells transmitted from the communication node a are never generated in a zone consisting of (N+2) W−(N+2) $n_a$ cell slots successively received other than those not used yet or other than those sent to the communication node a.

From the description above, it is concluded that a maximum number of transmission cells are generated in a case where (N+2) $n_a$ pieces of transmission cells transmitted from the communication node a are generated in a zone consisting of (N+2) W−(N+2) $n_a$ cell slots successively received other than those not used yet or other than those sent to the communication node a, and in that case an access delay time in the transmission cells is as described below.

Figure 15:
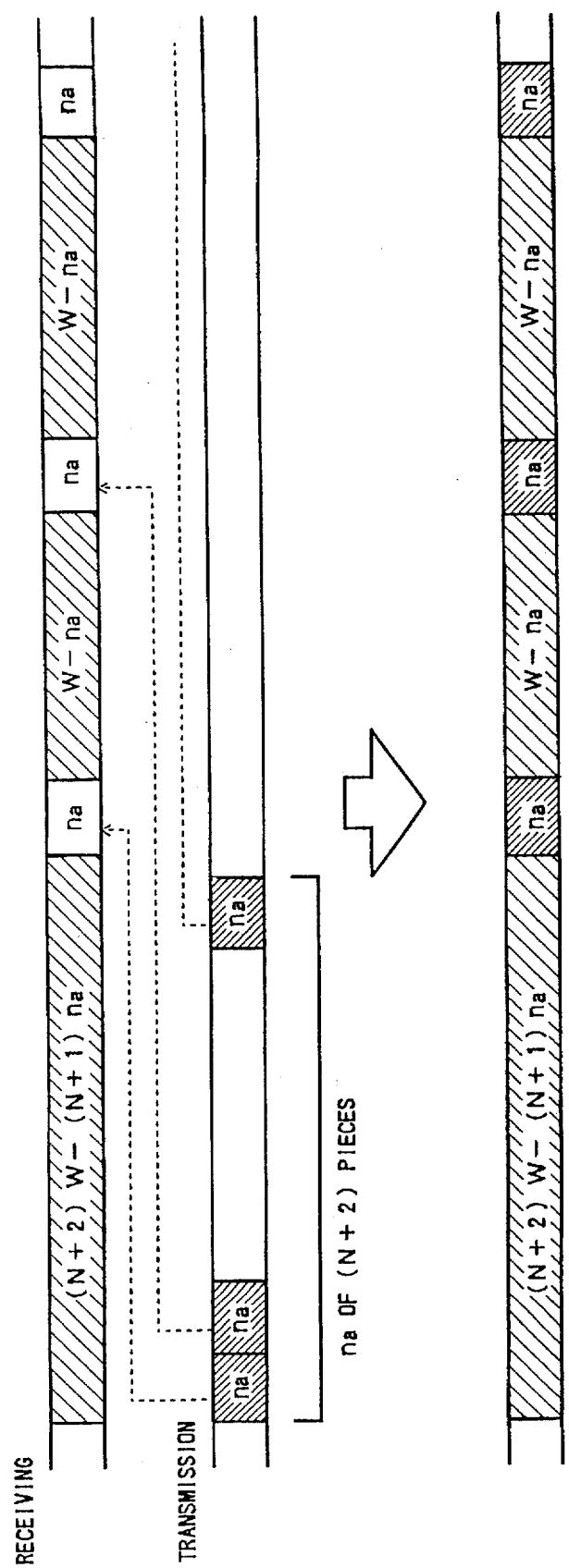
FIG. 15 is an explanatory view for transmission cell insertion in a communication node in a case where a cell is received from a transfer path in the worst case shown in FIG. 11.

FIG. 15 is a view for explanation of the access delay.

In the arriving pattern shown in FIG. 11, it is impossible to insert a transmission cell from the communication node a into the first N windows. As at least $n_a$ pieces of cell slots not used yet or those sent to the communication node a exist in the next window, the $n_a$ pieces of transmission cells generated first are inserted here. Namely, the access delay time in the transmission cells is $(N+2)$ $W-(N+2)$ $n_a$ cell time. $n_a$ pieces of transmission cells generated secondly are further delay by 1 window (W cell time) from the cell slot with the $n_a$ pieces of transmission cells generated first inserted therein. Namely the access delay time in the transmission cells is $(N+3)$ $W-(N+3)$ $n_a$ cell time. Also in transmission cells generated subsequently, the access delay time is $(N+3)$ $W-(N+3)$ $n_a$ cell time.

In a case of the relay-preferred transfer system in which, under the condition that in all communication nodes there are the same number of cells which can be transmitted within a common window having the same size, arriving cells are preferentially transmitted providing jumping window control to cells transmitted from the communication nodes, a maximum access delay time from a point of time when a transmission cell is stored in a transmission buffer in a communication node i until a point of time when the transmission cell arrives in the communication node i having transmitted the transmission cell depends on the window size W as well as on a number N of communication nodes within the communication network, which means that the delay time is insured with the $(N+3)$ $W-(N+3)$ $n_i$ cell time.

Then consideration is made for a minimum number of buffers in a communication node required so that cells to be transmitted from the communication node are not aborted within the communication node.

As described in related to FIG. 11, a maximum number of transmission cells are stored in a transmission buffer in a communication node in a case where a maximum number of cell slots other than those not used yet or other than those sent to the communication node appear successively. The cell slots as described above successively appear at maximum by $(N+2)$ $W-(N+2)$ $n_i$ pieces. The transmission cells from the communication node i which can be generated within this cell time are stored in a transmission buffer, and as described above $(N+2)$ $n_i$ pieces of cells can be generated. For this reason, a minimum number of buffers required so that cells to be transmitted from the communication node i are not aborted within the communication node i depends on a number of communication nodes in a communication network as well as a number of cells which can be transmitted from the communication node i into a window, and the number is $(N+2)$ $n_i$ pieces.

Figure 16:
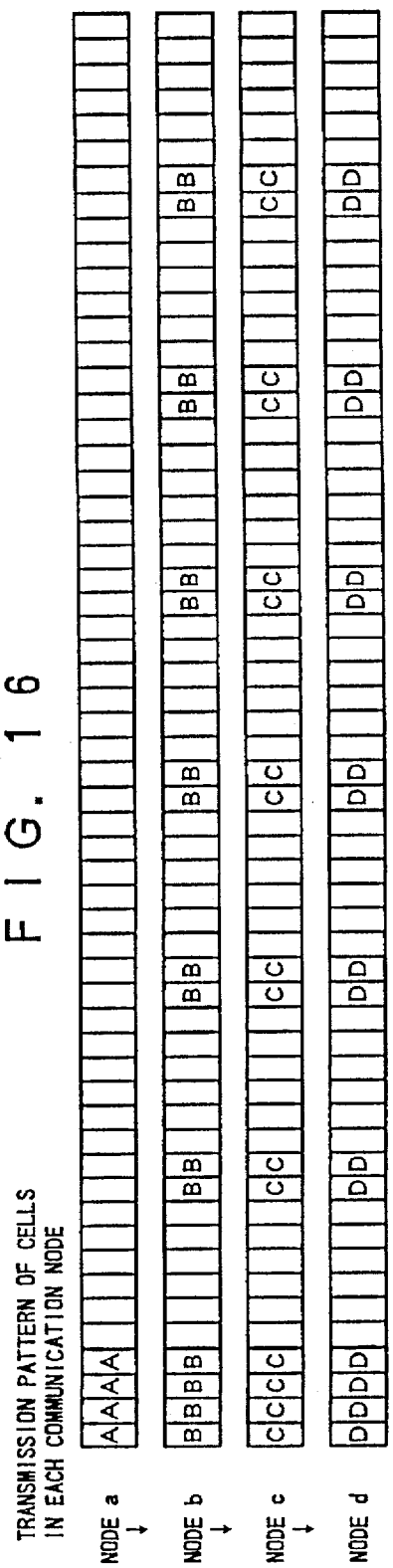
FIG. 16 is a view showing a state of waiting for a transmission cell between a cell and a node in a transfer path; shown with concrete numerical values.
Figure 17:
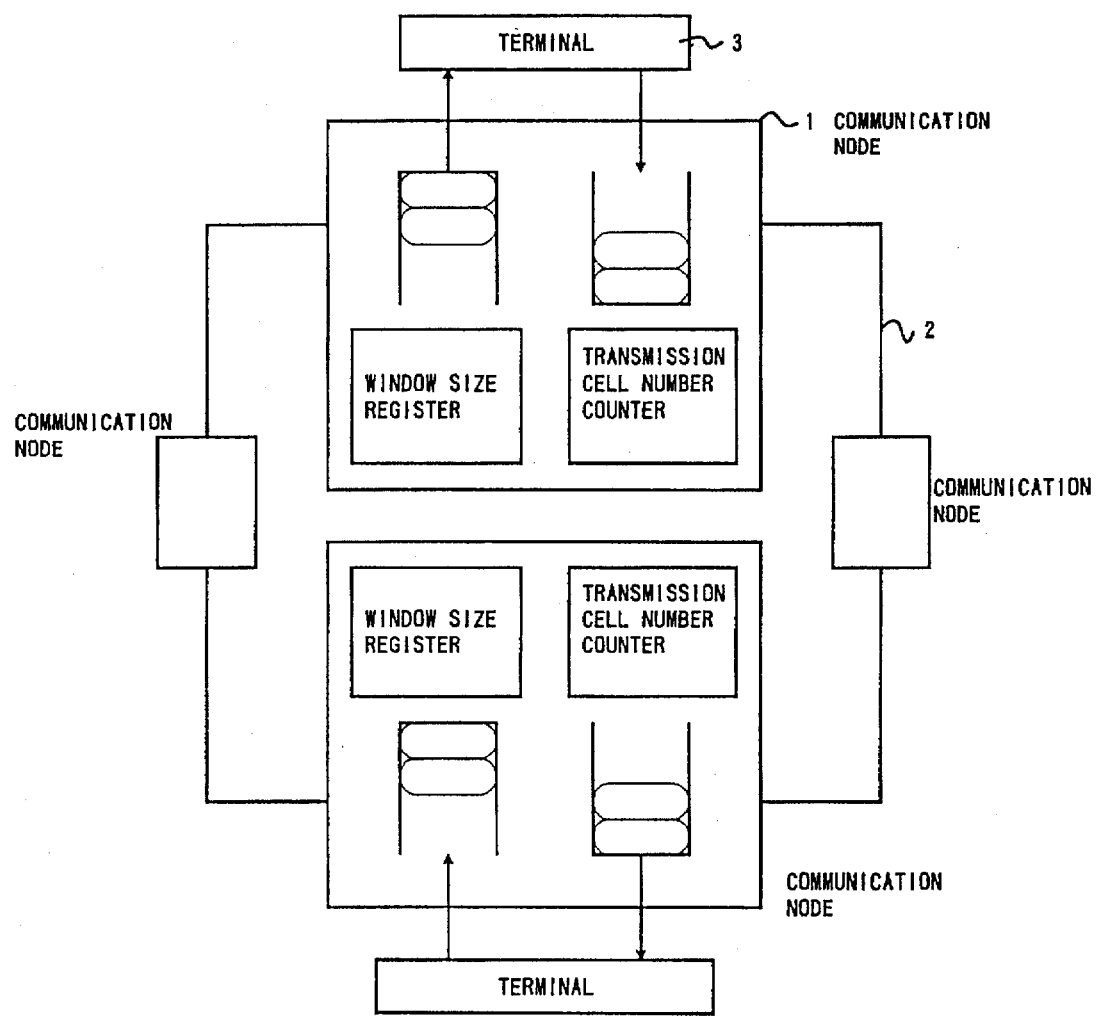
FIG. 17 is a view showing a communication sequence in the conventional type of ATMR.
Figure 18:
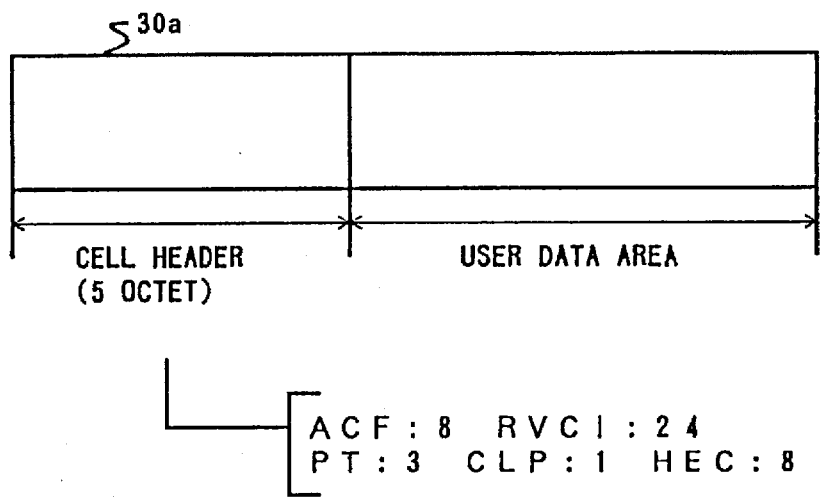
FIG. 18 is a view showing a format of a cell used in the conventional type of ATMR.

For reference, FIG. 16 shows the worst case of an arriving pattern from a transfer path and an example of a number of buffers required in a case in which a number of communication nodes is 4, a number of cells which can be transmitted within a W cell time in each communication node is 2, and the window size is 8 cell time.

In Embodiment 3 described above, no consideration is made for a case in which each communication is used for various purpose in communications, and the description assumes a case where the same cells are used for all types of communication. In this case, communications not having strict requirements for a delay time and communications having strict requirements for delay time are treated under the same conditions. So if preferential cells in terms of a delay time are applied for communications having strict requirements for a delay time and not-preferential cells to communications not having strict requirements for a delay time, and by preparing different buffers in all communication nodes within a communication network, and also by storing preferential cells in cells for storing therein preferential cells, the preferential cells are always taken out and transmitted from a head of the buffer. With this configuration, it is possible to prevent unnecessary time delay because of effects communications not having strict requirements for a delay time over communications having strict requirements for a delay time. The priority levels may be divided to a plurality of classes.

It is clear that a maximum access delay time and a minimum number of buffers for preferential cells required in a communication node are the same as those in Embodiment 3 on the condition that the processing as described above is executed in each communication node within the communication network.

As described above, with the present invention, a transmission buffer having a capacity larger than a certain value, a transmission cell number counter, and a transmission control means for monitoring and controlling transmission of a window are provided in each communication node, so that a transmission cell can be transmitted to a transfer path with a delay less than that decided in the entire system Also transmission buffers more than a preset value are provided in each node, so that abortion of transmission cells can be prevented.

Also for jumping window control, a transmission buffer having a capacity larger than a certain value, a transmission cell number counter, and a transmission control means for monitoring and controlling transmission of a window are provided in each node, so that transmission cells can be transmitted to a transfer path with a delay less than that decided in the entire system.

Also for jumping window control, transmission buffers more than a preset value are provided in each node, so that abortion of transmission cells in a communication node can be prevented.

Furthermore, transmission buffers having 2 or more types of priority are provided in each node, so that transmission cells having a higher priority are transmitted preferentially and also abortion of transmission cells having a higher priority can be prevented.

Also transmission buffers for preferential cells more than a preset value are provided in each node, so that abortion of transmission cells having a higher priority can be prevented.

Other objects and features of this invention will become understood from the following description with reference to the accompanying drawings.

What is claimed is:

1. An access control device for a ring-type ATM node comprising:
    a transmission buffer for storing therein transmission cells for a time period corresponding to at least 2 $(W-n_a)$ cells, wherein a window size in ring is W cells and a number of transmission cells allocated to a communication node in the W cells is $n_a$;
    a transmission cell number counter for counting a number of transmission cells from the node in said W window size; and
    a transmission control means for sending transmission cells in said transmission buffer to a transfer path when a number provided by said transmission cell number counter corresponds to a number allocated to the communication node.

2. An access control device for a ring-type ATM node according to claim 1, wherein a number of transmission cells allocated to a communication node is $n_a$ pieces and at least $2n_a$ transmission buffers are provided.

3. An access control device for a ring-type ATM node according to claim 1, wherein priority of transmission cells in a node is classified to 2 or more levels, transmission buffers corresponding to the priority levels respectively are provided, and transmission cells from a transmission buffer having a higher priority are send out before transmission cells from a transmission buffer having a lower priority.

4. An access control device for a ring-type ATM node according to claim 3, wherein at least a minimum number of transmission buffers is $2n_a$.

5. An access control device for a ring-type ATM node, wherein each node comprises:

a transmission buffer for storing therein transmission cells for a time period corresponding to at least $(N+3)$ $W-(N+3) n_a$ cells, wherein a number of nodes in the ring is N, a window size is W cells, and a number of transmission cells allocated to a communication node within said W cells is $n_a$;

a window control circuit for counting said W cell time and resetting the window to set a new window size each time said W cell time has passed;

a transmission cell number counter for counting a number of transmission cells from the communication node in said window size; and a transmission control means for transmitting transmission cells in said transmission buffer to a transfer path if a number of cells indicated by said transmission cell number counter corresponds with a number allocated to the communication node.

6. An access control device for a ring-type ATM node according to claim 5, wherein a number of transmission cells allocated to a communication node is $n_a$ and at least $(N+2) n_a$ transmission buffers are provided.

7. An access control device for a ring-type ATM node according to claim 5, wherein priority of transmission cells in a node is classified to 2 or more levels, transmission buffers corresponding to the priority levels respectively are provided, and transmission cells from a transmission buffer having a higher priority are sent out before transmission cells from a transmission buffer having a lower priority.

8. An access control device for ring-type ATM node according to claim 7, wherein at least a minimum number of transmission buffers is $(N+2) n_a$.

9. A method for transmitting data in a ring-type ATM communication network having a plurality of nodes, the method comprising steps of:

providing at a node of the network a transmission buffer capable of storing transmission cells for a time period corresponding to at least $2(W-n_a)$ cells, wherein a window size of the network is W, and a number of transmission cells allocated to the node is $n_a$;

storing a transmission cell in the transmission buffer;

counting transmission cells from the node to determine a present number of a transmission cell in a window; and transmitting the transmission cell in the transmission buffer when the present number is a number allocated to the node.

10. The method of claim 9, wherein the step of providing a transmission buffer includes a step of providing a transmission buffer having a storage capacity of at least $2n_a$ transmission cells.

11. The method of claim 10, further comprising a step of:

assigning one of a plurality of priority levels to each of the transmission cells to be transmitted from the node;

wherein the step of providing includes a step of providing a transmission buffer for each of the plurality of priority levels; and wherein the step of transmitting includes a step of transmitting higher priority level transmission cells before lower priority transmission cells.

12. The method of claim 8, further comprising a step of:

assigning one of a plurality of priority levels to each of the transmission cells to be transmitted from the node;

wherein the step of providing includes a step of providing a transmission buffer for each of the plurality of priority levels; and wherein the step of transmitting includes a step of transmitting higher priority level transmission cells before lower priority transmission cells.

13. A method for transmitting data in a ring-type ATM communication network having a plurality of nodes, the method comprising steps of:

providing at a node of the network a transmission buffer capable of storing transmission cells for a time period corresponding to at least $(N+3)W-(N+3)n_a$ cells, wherein a number of nodes in the ring is N, a window size of the network is W, and a number of transmission cells allocated to the node is $n_a$;

storing a transmission cell in the transmission buffer;

counting transmission cells from the node to determine a present number of a transmission cell in a window; and transmitting the transmission cell in the transmission buffer when the present number is a number allocated to the node.

14. The method of claim 13, wherein the step of providing a transmission buffer includes a step of providing a transmission buffer having a storage capacity of at least $(N+2)n_a$ transmission cells.

15. The method of claim 14, further comprising a step of:

assigning one of a plurality of priority levels to each of the transmission cells to be transmitted from the node;

wherein the step of providing includes a step of providing a transmission buffer for each of the plurality of priority levels; and wherein the step of transmitting includes a step of transmitting higher priority level transmission cells before lower priority transmission cells.

16. The method of claim 13, further comprising a step of:

assigning one of a plurality of priority levels to each of the transmission cells to be transmitted from the node;

wherein the step of providing includes a step of providing a transmission buffer for each of the plurality of priority levels; and wherein the step of transmitting includes a step of transmitting higher priority level transmission cells before lower priority transmission cells.

\* \* \* \* \*